J. H. HILL.
BUSHING FOR BOWLING BALLS.
APPLICATION FILED JUNE 30, 1916.
1,217,940.
Patented Mar. 6, 1917.
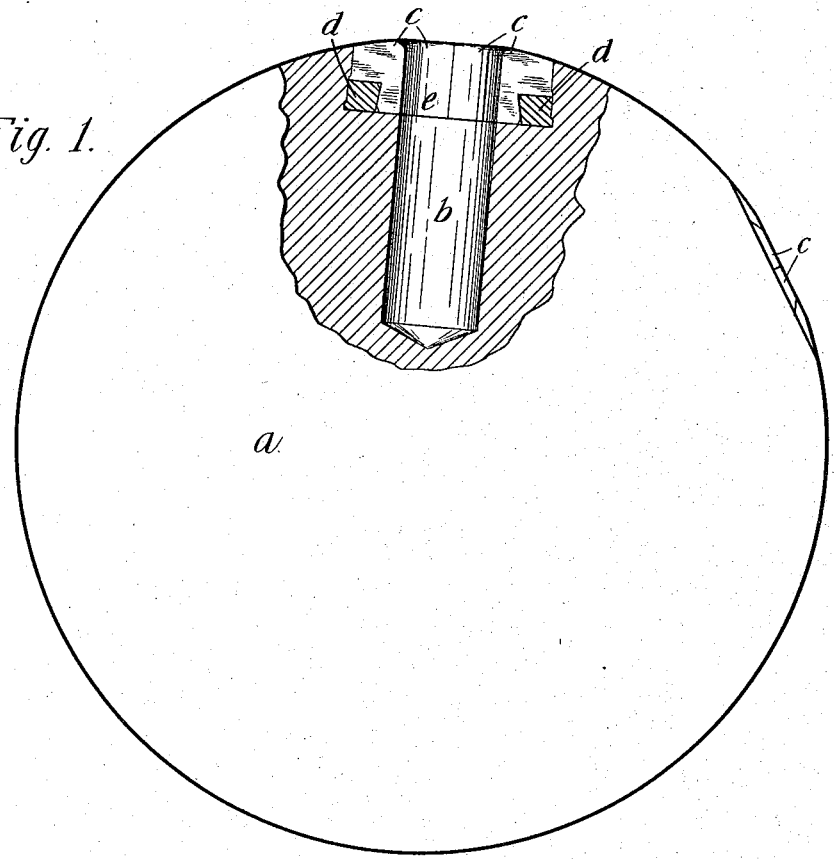
Fig. 1.
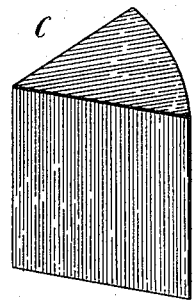
Fig. 4.
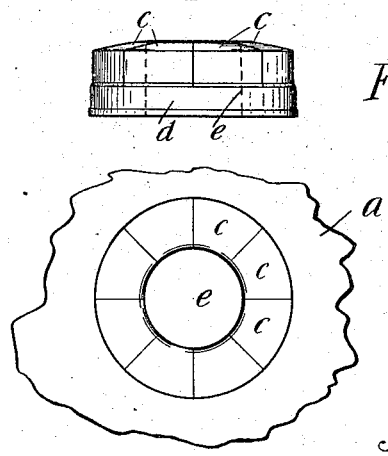
Fig. 2.
Fig. 3.
Inventor
Jesse H. Hill
By
Atty.

UNITED STATES PATENT OFFICE.

JESSE H. HILL, OF PORTLAND, OREGON, ASSIGNOR OF ONE-FOURTH TO BRICE WILSON AND ONE-FOURTH TO JOHN A. STUART, BOTH OF PORTLAND, OREGON.

BUSHING FOR BOWLING-BALLS.

1,217,940.  Specification of Letters Patent.  Patented Mar. 6, 1917.

Application filed June 30, 1916. Serial No. 106,988.

*To all whom it may concern:*

Be it known that I, JESSE H. HILL, a citizen of the United States, and a resident of the city of Portland, county of Multnomah, State of Oregon, have invented a certain new and useful Improvement in Bushings for Bowling-Balls, of which the following is a specification.

This invention relates to an improved form of bushing to be used in the finger-holes of bowling balls.

The hard usage to which bowling balls are subjected results in the chipping of the edges of the finger-holes. These irregularities deform the ball from a true sphere, and for the purpose of restoring the balls to true shape it is customary to counter-bore the finger-holes and insert therein a bushing, the outer end of which may be finished off to a true spherical surface. This bushing is made of laminated fiber material. This laminated material is composed of thin fibrous sheets, highly compressed together. Prior to my invention the manner of making a bushing from this material was to cut a cylindrical body therefrom in which the laminations were parallel to the base. Consequent usage of a bowling ball having therein a bushing of this character caused the outer laminations to peel off, leaving the ball once more irregular.

The main object of the present invention is to provide a bushing of this character in which the laminations will be perpendicular to the base of the bushing. The edges of the laminations will then assimilate the wear of usage, and will not be subject to the objectionable peeling off, as previously referred to.

The features of my invention are fully shown in the accompanying drawings, in which:

Figure 1 is an elevation, partly in section, of a bowling-ball having incorporated therein bushings of my invention;

Fig. 2 is a side elevation of a bushing;

Fig. 3 is a plan view of same; and

Fig. 4 is an isometric perspective view of one of the segments from which the bushing is formed, and showing in diagrammatic form the general arrangement of the laminations.

*a* represents a bowling-ball of usual type, and *b* is a finger-hole. The outer end of this hole is counter-bored, and the bushing of my invention is mounted therein. Said bushing comprises complementary segments *c*, clamped together and turned down so as to form a true cylinder having a diameter slightly greater than the diameter of the counter-bore in which said bushing is to be inserted. Said segments are cut from the laminated fibrous material so that the laminations will be perpendicular to the base of the bushing, as shown in Fig. 4. After the segments *c* have been assembled to the form of a true cylinder, a peripheral groove is cut around the lower end of the cylinder, and a clamping ring *d* is pressed in place thereon, so as to firmly hold said segments together.

The bowling-ball is then heated so as to expand the counter-bore, and the bushing is pressed in place therein. Consequent shrinkage of the bore will hold the bushing securely in place. For the purpose of augmenting this shrink-fit, the base of the bushing and the clamping ring are made slightly larger than the outer end of said bushing. The outer end of the bushing is then finished off to conform with the spherical surface of the ball, the interior of the bushing *c* being finished as at *e* to conform with the hole *b* of the ball.

I claim:

1. The combination with a bowling ball having a counter-bored finger-hole, of a bushing for said hole, said bushing comprising a plurality of complementary segmental sections, and means for clamping said sections together.

2. The combination with a bowling ball having a counter-bored finger-hole, of a bushing for said hole, said bushing comprising a plurality of complementary segmental sections, and a clamping ring for holding said sections together.

3. The combination with a bowling ball having a counter-bored finger-hole, of a bushing for said hole, said bushing comprising a plurality of complementary segmental sections of laminated material, and means for clamping said sections together.

4. The combination with a bowling ball having a counter-bored finger-hole, of a bushing for said hole, said bushing comprising a plurality of complementary segmental sections of laminated material, and a clamping ring for holding said sections together.

5. The combination with a bowling ball having a counter-bored finger-hole, of a bushing for said hole, said bushing comprising a plurality of complementary segmental sections of laminated material, the laminations being arranged perpendicularly to the base of the bushing, and means for clamping said sections together.

6. The combination with a bowling ball having a counter-bored finger-hole, of a bushing for said hole, said bushing comprising a plurality of complementary segmental sections of laminated material, the laminations being arranged perpendicularly to the base of the bushing, and a clamping ring for holding said sections together.

JESSE H. HILL.

Copies of this patent may be obtained for five cents each, by addressing the "Commissioner of Patents, Washington, D. C."